Sept. 6, 1949.

G. W. CRISE 2,481,087

METHOD OF ELECTRIC RESISTANCE SEAM
WELDING BIMETALLIC ELEMENT
Filed Dec. 7, 1944

Inventor
George W. Crise
By
Attorney

Patented Sept. 6, 1949

2,481,087

UNITED STATES PATENT OFFICE 2,481,087

METHOD OF ELECTRIC RESISTANCE SEAM WELDING BIMETALLIC ELEMENT

George W. Crise, Columbus, Ohio

Application December 7, 1944, Serial No. 567,089

2 Claims. (Cl. 219—10)

The object of my invention is to provide an improved and efficient method of making bimetal from pre-drawn strips through the agency of electric welding.

In the present art of producing bimetal of the type employed in thermostatic controls, it is customary to start production by welding together two large ingots of dissimilar metals, such as Invar and brass, and then by the tedious process of rolling, trimming of edges and annealing, repeatedly performed until the desired thickness is reached, the bimetallic strips are produced. Sheets of bimetal so produced are then cut to form strips of desired width and length, and the finished strips are then inspected for thick and thin spots for determining irregularities in the relative thickness of the two metals that remain on either side of the weld.

In addition to the expensive work of preparing the original ingots, which includes machining the same all over, cleaning and heat soaking, there are inherent waste from not only the edges which must be trimmed for straightness, but also from imperfections in the weld which develop from continued rolling and spoil large sections of the completed sheets due to unwelded spots in the finished sheet.

Another serious handicap is the fact that the dissimiliar metals have different flow characteristics, causing, quite often, one side to be thinner than the other in spots, which greatly affects the operating characteristics of the finished bimetal.

In my process, I seek to eliminate all the foregoing defects and, in addition, produce a bimetal having greater flexing efficiency and stability over a wide temperature range by eliminating the side stresses which develop in bimetal by wide and medium widths.

It is well known in the field of bimetal manufacture that when the high flex side of bimetal expands with heat, it expands laterally as well as longitudinally. This tends to cause the strip to assume a transversely curved shape, similar to that of a self-straightening steel tape. This transverse stiffening action opposes the longitudinal bending action and introduces stresses in the bimetal which at high temperatures causes the same to assume a set or new shape which destroys the accuracy and sensitivity of the thermostatic equipment of which the bimetal forms an active part.

In the present invention, this effect is eliminated by joining the dissimilar metals of the bimetal only in the central longitudinal region of the strip, leaving the regions on opposite sides of the weld free to slip one upon the other, thereby eliminating lateral strains which produce transverse curling of the strips when the same are formed in accordance with prior practice.

For a further understanding of the nature of the invention, and additional objects and advantages thereof, reference is to be had to the following description and the accompanying drawing, wherein.

Figure 1:
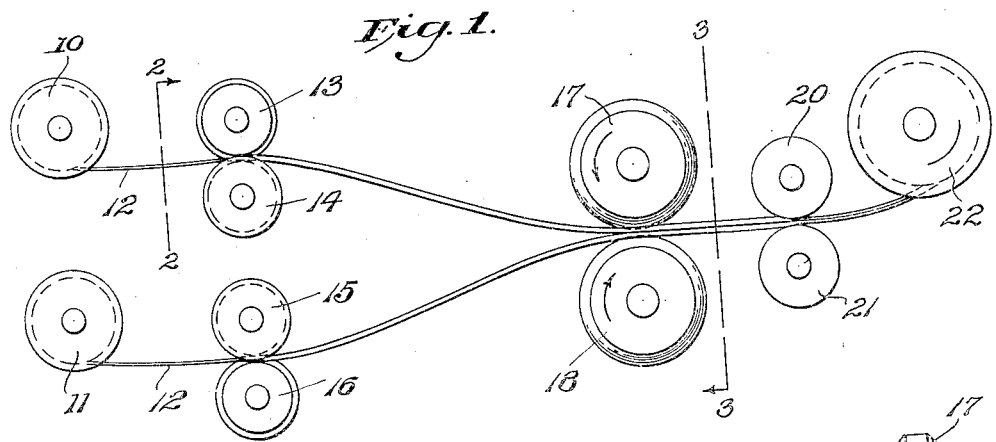
Fig. 1 is a side elevational view of the strip-forming and welding rolls utilized in my improved process.
Figure 2:
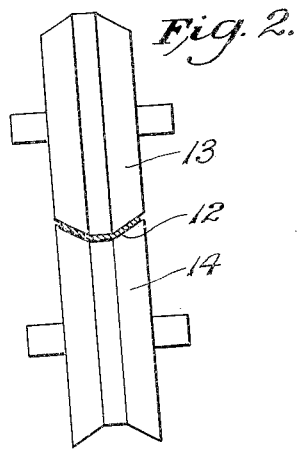
Fig. 2 is a sectional view on the line 2—2 of Fig. 1.
Figure 3:
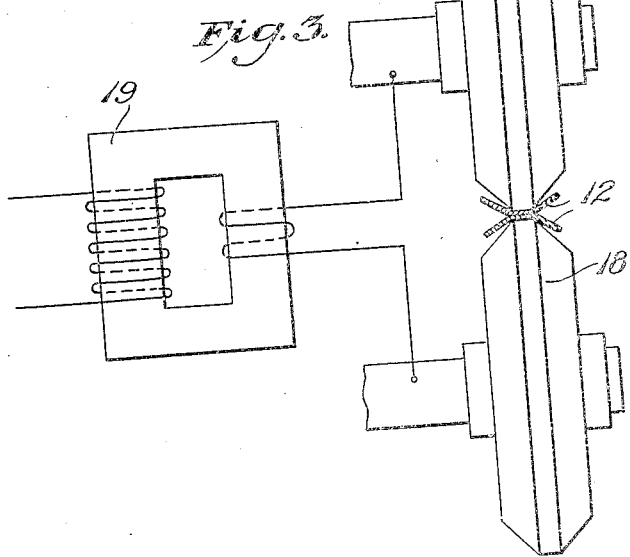
Fig. 3 is a similar view on the line 3—3 of Fig. 1.

Referring more particularly to the drawings, the numerals 10 and 11 designate two reels which carry strips of dissimilar, cold-drawn or rolled metals, such as brass or Invar. As these strips unwind from the reels, as at 12, they are caused to pass through shaping or forming rolls, indicated at 13, 14 and 15, 16. The rolls 13 and 16 are formed with convex rims, while the rolls 14 and 15 have concaved rims, as illustrated in Fig. 2. The action of these rolls is to impart a set transverse configuration to the strips so that the side regions thereof are separated, as shown in Fig. 3.

After being so formed, the strips are then drawn between a pair of copper welding rolls 17 and 18, the latter being energized by the low-voltage transformer 19, in accordance with the general practice for seam welding. From the rolls 17 and 18, the welded strips, which are joined centrally and longitudinally, as disclosed in Fig. 3, are advanced for passage between a pair of smooth, flat-faced straightening rolls 20 and 21, where the separated regions or edges are pressed together into smooth, flat and adjoining relationship to form the complete bimetallic strip, the finished strip being wound on the receiving reel, indicated at 22.

It will be obvious that by using smooth, round edged cold-drawn shapes which are ordinarily referred to in the art as "cold-drawn, round edged flat wire," such shapes when welded together in the central longitudinal regions thereof only, and pressed flat, provide a bimetal with smooth, outer longitudinal edges, this being in contrast with the cut strips as are now used, which produce sharp edges and are dangerous to handle. Moreover, the outer edge regions of my improved bimetal strip are free to slip over one another laterally, while at the same time providing complete and adequate longitudinal junction. Strips so formed can be cut into desired lengths without any waste on the part of the manufacturer utilizing the same, a condition which is not possible when manufacturers are required to purchase the bimetal in sheets and to cut the same longitudinally and transversely into desired lengths, as is now the prevailing practice.

Also, in my process, the metals utilized may possess any suitable relative thickness and can be readily joined, thus producing maximum flexure of the finished strip by matching the material thicknesses according to their modulus of elasticity.

I claim:

1. The method of producing bimetal elements which comprises forming a pair of transversely flat strips composed of dissimilar metals into strips having longitudinally extending flat central portions and lateral edge portions disposed in angular relation to the central portions of the strips, bringing said strips into longitudinally and vertically aligned juxtaposition with the central portions of each of the strips in abutting relation and the edge portions thereof in separated relation, and electric resistance welding the strips together continuously along their abutting central portions only, whereby to leave the lateral edge portions of the strips free for relative movement.

2. The method of producing bimetallic elements which comprises forming a pair of strips composed of dissimilar metals into strips having longitudinally extending flat central portions and lateral edge portions disposed in angular relation to the central portions of the strips, bringing said strips into longitudinal and vertical alignment with the flat central portions of the strips in engagement and the edge portions thereof separated, and uniting said strips by electric resistance welding the same continuously only along their flat central portions.

GEORGE W. CRISE.

REFERENCES CITED

The following references are of record in the file of this patent:

UNITED STATES PATENTS

| Number | Name | Date |
|---|---|---|
| 1,220,774 | Murray | Mar. 27, 1917 |
| 1,991,495 | Derby | Feb. 19, 1935 |
| 1,991,496 | Derby | Feb. 19, 1935 |

FOREIGN PATENTS

| Number | Country | Date |
|---|---|---|
| 213,596 | Great Britain | June 29, 1925 |
| 33,946 | Denmark | Nov. 29, 1924 |